United States Patent Office 2,850,379
Patented Sept. 2, 1958

2,850,379

PROCESS FOR PRODUCTION OF REFRACTORY METALS

Arthur S. Hawkes, Royal Oak, Mich., assignor to Ethyl Corporation, New York, N. Y., a corporation of Delaware No Drawing. Application March 15, 1954
Serial No. 416,425

3 Claims. (Cl. 75—84.1)

This invention relates to the production of refractory metals and in particular is concerned with obtaining these metals from their oxides.

Many methods have been known for producing the refractory metals from their oxides. Among such methods has been the utilization of a metal such as calcium for reducing the oxide to the free metal. Briefly, this process involves heating the mixture of the refractory oxide and calcium metal to an elevated temperature in an inert atmosphere. Because of certain impurities resulting in the product, the method has not received any appreciable commercial attention. Another disadvantage to the process has been the comparative expense of the reducing material. Similarly, calcium hydride has been employed for reducing the metallic oxides in a much similar process to that above. The latter process as the former has also received little commercial attention because of the low yields and low purity of the product obtained, and here again calcium hydride is quite an expensive commodity. Improvements have been made upon these processes, but as yet no satisfactory method has been obtained for achieving the metal in high purity and in high yield from the oxide. The purity of the metal is particularly critical inasmuch as one of the most attractive uses for these metals is in fabrication which requires ductile grade material. Accordingly, an efficient and economical process for obtaining high purity refractory metals is highly desirable.

It is an object of this invention to provide a new and novel process for obtaining refractory metals from their oxides. A further object is to provide a process for obtaining refractory metals in higher yield and purity. Another object is to produce refractory metals by a process employing inexpensive by-product materials. A still further object of this invention is to provide a mixture especially adapted for reaction with difficultly reducible metal oxides to yield the free metal. A specific object is to provide a process for obtaining titanium metal of high purity in high yield.

The above and other objects of this invention are accomplished by a process comprising heating to elevated temperature a refractory metal oxide, an alkali metal hydride, and an alkaline earth hydride. In general, it is preferred to heat the refractory metal oxide, alkali metal hydride, and alkaline earth hydride to a temperature above about 800° C. under a pressure of hydrogen gas. In a particular embodiment of this invention, refractory metal oxides are reacted with a mixture of an alkali metal hydride and alkaline earth hydride in the presence of inorganic halides selected from the ground consisting of alkali metal and alkaline earth metal halides. In this instance, the process of this invention is most advantageously conducted at a temperature sufficient to maintain said halide or mixture of halides in the molten state, that is, above about 800° C. In a specific embodiment of my invention, I react titanium dioxide at between about 800–950° C. with a mixture of sodium hydride, calcium hydride, sodium chloride, and calcium chloride in the presence of hydrogen under pressure slightly above atmospheric and subsequently displace the hydrogen with an inert gas, heat the reaction mixture to above about 1000° C. at reduced pressure, and recover titanium from the residue.

In one particular embodiment of my invention, I react a refractory metal oxide with a mixture of alkali metal hydride and alkaline earth metal hydride, especially sodium hydride and calcium hydride obtained by hydrogenating the sludge by-product resulting when producing sodium electrolytically. Briefly, the so-called "sludge" is produced by electrolysis of, for example, molten sodium chloride in the presence of calcium chloride as a melting point depressant. During the electrolysis, calcium metal as well as sodium is produced at the cathode and at the temperature of the operation dissolves in the sodium melt. The solution is removed from the cell, cooled, and most of the calcium crystalizes out. This crude mixture containing calcium metal is purified usually by mechanical separation and most of the sodium recovered therefrom. The residue or sludge obtained from such separation consists of a mixture of solids containing crystals of calcium embedded in a matrix of sodium. It also contains impurities such as sodium and calcium oxides and chlorides. The total amount of metal varies, but in general is from 90–95 percent. The amount of calcium contained therein ranges up to about 30 percent and generally not below about 10 percent. It is sometimes convenient to concentrate this sludge by filtration or other means to a point at which the metallic calcium content ranges up to about 50 precent of the total metal present. It has been found that the sodium-calcium sludge, either concentrated or as directly obtained in the separation operation, can be hydrogenated and the resulting product employed as a reducing mixture for winning free refractory metals from their oxides. In general, the preferred amount of alkaline earth metal contained in the sludge should be at least 0.2 part by weight of alkaline earth metal per part by weight of alkali metal. Thus, in this embodiment of my invention, I employ sludge containing the above proportions of alkaline earth metal to alkali metal, hydrogenate this mixture at a temperature above about 800° C., add thereto refractory metal oxide, continue the reaction in the presence of the hydrogen atmosphere, and at the completion of the reaction, increase the temperature to above about 1000° C., and reduce the pressure. At this point, the hydrogen gas is replaced by another inert gas and the volatile constituents are removed and recovered. The free refractory metal is then recovered from the residue. It is to be understood that this entire operation can be conducted in situ, and generally this is preferred. That is, a mixture of the sludge and refractory metal oxide are heated to the above-mentioned temperature while simultaneously passing hydrogen gas through this reaction mixture and then the process proceeds as described above.

In a still more preferred embodiment of my invention, wherein I react a refractory metal oxide with an alkali metal hydride and an alkaline earth hydride in the presence of inorganic halides, it has been found that the entire process is best conducted as an in situ reaction. In this embodiment a mixture of an alkali metal and alkaline earth halide are heated to a sufficient temperature to instigate the equilibrium reaction between these materials to yield a mixture of alkali metal, alkaline earth halide, alkaline earth metal, and alkali metal halide, and hydrogen gas is reacted with this mixture. To this hydrogenated mixture is then added the refractory metal oxide to be reduced, and reaction is continued in the presence of hydrogen for about 30 minutes under a low pressure. At the completion of the reaction, the mixture is heated to above about 1000° C., the pressure reduced, the hydrogen gas replaced by another inert gas by a vacuum or other suitable means. By heating the reaction mixture at the latter temperature under a vacuum, any titanium hydride which is formed is dissociated and volatile alkali and alkaline earth metal is removed and recovered. The refractory metal is then recovered from the residue. Best results are obtained when an excess of the alkali metal and alkaline earth halide is employed. It is not necessary to add the refractory metal oxides separately and in fact, better results are obtained when both the hydrogenation and reduction reactions are carried out simultaneously. Thus, titanium metal is produced by heating a mixture of 1 mole of titanium dioxide, at least 2 moles of calcium chloride, and at least 4 moles of sodium while continuously passing hydrogen through the reaction mixture at a temperature above about 800° C., and pressure above atmospheric for a period of about 30 minutes, subsequently heating the reaction mixture to a temperature above about 1000° C., displacing the hydrogen gas with another inert gas, applying a vacuum to the system, and recovering the titanium metal from the residue.

The process of this invention as set forth in its broadest aspects above has particular advantage over those of prior art processes. In this invention the refractory metal oxide is in effect reduced by a mixture of alkali metal hydride, alkaline earth metal hydride, alkali metal, and alkaline earth metal. Despite the fact that the reaction is conducted at temperatures sufficient to dissociate a portion of the alkali metal hydride and alkaline earth metal hydride, the refractory metal is obtained in higher yield and higher purity due to the enhanced reactivity of the reducing matreials brought into intimate contact with the refractory metal oxide. In addition, the pressure of hydrogen gas prevents dissociation of the hydrides and maintains the equilibrium reactions between the hydrogen and alkali and alkaline earth metals, thus maintaining the reducing mixture in its most reactive state. Generally speaking, the yield will be greater than about 90 percent, and the purity will be greater than about 95 percent. Further, when employing the presence of the halides in the reaction mixture, a fluxing action takes place which is of particular advantage in promoting contact between the refractory metal oxide and the reducing materials, and likewise aids in the removal of contaminants which depreciate the purity of the metal produced. It is believed that the enhanced purity and yield of the metal obtained is due to the competing equilibrium reactions of the reducing materials of my mixture.

To demonstrate one embodiment of this invention, a reactor equipped with means for external heating, means for charging and withdrawing liquid and solid reactants and products, means for removal of gaseous materials, and means for providing a blanket and pressure of gas is employed. To this reactor is added 160 parts by weight of titanium dioxdie, 69 parts by weight of calcium hydride, and 95 parts by weight of sodium hydride. Hydrogen gas is continuously passed through the mixture, and a pressure of about one atmosphere of this gas is maintained in the system. The reaction is conducted at about 800° C. and the mixture is maintained at this temperature for a period of about one hour. At the end of this period, the mixture is heated to about 1000° C. and the pressure reduced and the hydrogen gas replaced by a continuous flow of argon gas, preferably anhydrous and nitrogen and oxygen free. The residue remaining in the reactor is cooled to room temperature while under the argon atmosphere. It is then washed with alcohol, treated with dilute acid, washed with water, and finally dried. In this manner, more than 91 parts of titanium metal is obtained of over 95 percent purity. Alternately, similar results are obtained when the reaction mixture comprises titanium dioxide and the calcium hydride and sodium hydride are formed in situ by passing hydrogen gas through the mixture of titanium dioxide, calcium, and sodium at about 800° C. The procedure is then followed as set forth above.

To demonstrate another embodiment of my invention, to the reaction vessel described above is added 100 parts by weight of titanium dioxide and 1000 parts of sodium-calcium sludge obtained as a by-product of Downs cell sodium production and containing 20 percent by weight metallic calcium. Hydrogen gas is continuously passed through the mixture and the temperature is raised to about 800° C. The reaction is carried out for a period of about 1½ hours under a pressure of about one atmosphere controlled by the feed and discharge of hydrogen gas. At the end of this period, the mixture is heated to about 1000° C., the pressure reduced, and the hydrogen gas replaced by a continuous flow of argon gas preferably anhydrous and nitrogen free. The volatile constituents are thereby removed and sodium condensed therefrom. The residue remaining in the reactor is cooled to room temperature while under the argon atmosphere. The residue is then washed with alcohol, treated with dilute acid, then washed with water and finally dried. By this technique, more than 55 parts of titanium metal is obtained of over 95 percent purity. The sodium which is collected in the air-cooled condenser is of distilled grade.

As an example of another embodiment of this invention, a mixture of 13.3 parts titanium dioxide, 111 parts calcium chloride, and 56 parts of sodium are placed in a reaction vessel similar to that described above. The contents of the reactor are then heated to a temperature of about 800° C. while continuously agitating and passing hydrogen through the mixture. By this method the equilibrium mixture of sodium, calcium chloride, calcium, and sodium chloride is formed and hydrogenated. The procedure is then continued as described above. The product obtained will be in high yield, about 56 parts, and comprises titanium metal of greater than 95 percent purity.

As another example of the process of this invention, 56 parts of sodium and 111 parts of calcium chloride are placed in the reactor and heated to a temperature between about 750–800° C. Hydrogen gas is continuously passed through the reaction mixture for a period of about 10 minutes. The reaction mixture thus obtained, comprising the hydrogenated equilibrium mixture described above, is then cooled to room temperature and stored under suitable atmosphere for subsequent admixture and reaction with a refractory metal oxide at about 900° C. Alternately, the reaction mixture can be maintained at the aforementioned temperature and about 13.3 parts of titanium dioxide added to this mixture. The mixture is maintained at that temperature for a period of about 30 minutes. At the end of this time, the procedure is continued essentially the same as described in the preceding examples for obtaining the free titanium metal.

Other refractory metal oxides can be employed in the process of this invention, that is, the oxides of the metals such as, for example, zirconium, vanadium, chromium, hafnium, thorium, uranium, and the like can be substituted for the titanium dioxide of the preceding examples. Similarly, complex oxides can be employed such as, for example, calcium titanate, ilmenite, calcium zirconate, and the like. Additionally, the alkali metals—potassium, lithium, rubidium, and cesium and mixtures of the alkali metals—can be substituted for sodium. Further, other alkaline earth metals can be employed as for example, magnesium, strontium, and barium, and mixtures of the alkaline earth metals. Likewise, alkaline earth halides other than calcium chloride can be employed as, for example, calcium bromide and iodide, strontium, magnesium, and the like chlorides, bromides, and iodides or mixtures thereof. Primarily for economic and greater availability reasons, sodium is the alkali metal, calcium is the alkaline earth metal, and calcium chloride is the alkaline earth metal halide preferred here. With respect to the quantities of the particular reactants to be employed irrespective of whether a stepwise reaction is employed or an in situ reaction, it is preferable for best results to employ at least 50 percent by weight of the alkaline earth hydride required to reduce the refractory metal oxide in admixture with the quantity of alkali metal hydride as hereinafter pointed out. Excellent results are obtained when between about 80 percent and 200 percent of alkaline earth hydride required to reduce the refractory metal oxide is employed with the alkali metal hydride. For most efficient operation, the reaction mixture should contain at least 0.2 part by weight of alkaline earth hydride per part by weight of alkali metal hydride. In a more specific embodiment of this invention, between about 0.7 and 1.0 part by weight of alkaline earth metal hydride per part by weight of alkali metal hydride is preferred. These proportions provide a product of the highest purity in high yield. Quantities not within the ranges set forth above can be employed, however, are not preferred since the resultant product will contain contaminants not favorable to ready working of the metal.

As mentioned above and further described in the examples, one embodiment of this invention is to prepare mixtures which are especially suitable for reducing the refractory metal oxides under reaction conditions. These mixtures comprise essentially alkaline earth hydride and alkali metal hydride. It is preferred that the mixture contain at least 10 percent by weight of alkaline earth hydride and at least .2 part by weight of alkaline earth hydride per part by weight of alkali metal hydride. The mixture which I especially prefer comprises calcium hydride, sodium hydride, sodium chloride, and minor proportions of calcium chloride. Best results are achieved when these ingredients of the mixture are in the following proportions by weight: between about 10 and 40 percent of calcium hydride, between about 10 and 40 percent of sodium hydride, and the remainder being inorganic halides selected from the group consisting of alkali metal halide and alkaline earth halide and mixtures thereof. As mentioned previously, the mixture can be stored for later use in reaction with a refractory metal oxide or it can be formed in situ in the reduction process. If the reduction mixture is stored, it should be stored in an inert atmosphere, and it is preferred that it be pulverized before use. The mixture has particular advantage in that it is economical and highly efficient for use in producing high purity refractory metals from their oxides. An additional advantage of such a mixture is that the chlorides present serve as a flux for removing contaminants as, for example, calcium oxide.

For best results, it has been found that the reaction mixture should be maintained at reaction temperature for about 30 minutes and preferably from 1 to 4 hours. Shorter reaction periods can be employed, however, the yield will be slightly decreased. Similarly, during the course of the reduction, a slight pressure should be maintained within the system. Ordinarily, a pressure between about atmospheric and two atmospheres is sufficient, although higher pressures can be employed. Similarly, at the completion of the reduction, a vacuum is preferably applied to the system to remove volatile constituents and dissociate any refractory metal hydride which may form. However, atmospheric pressure can be employed to equal advantage although the period of dissociation should be longer for best results. Likewise, although it is preferred to raise the temperature of the reduction mixture to above about 1000° C. in order to remove and dissociate the hydrogen, this is not required if the period of dissociation is extended, that is, the temperature of reduction can be maintained for dissociation of the hydrogen.

The refractory metal oxide chosen should be free from absorbed moisture and when employed, the halides should be substantially anhydrous and free from any water of hydrolysis. For example, when calcium chloride is to be employed in the reduction of titanium dioxide, these materials are dehydrated either in situ or prior to actual reduction by heating at about 400° C. For best results, the reactants should be of small particle size. Similarly, it is particularly advantageous to efficient reaction and high purity of product to employ effective agitation in the reaction vessel. This can be done by mechanical stirring, plunging, the use of ball mill type equipment, and similar methods of obtaining agitation of the mixture. One particularly advantageous procedure I have found is to use a ball mill as the reactor. The use of a ball mill provides intimate contact between the reactants thus enhancing reaction rates and purity of product.

In some instances, depending upon the control and technique of reaction, the product obtained may not have the desired purity as, for example, in the case of titanium to yield a ductile metal. In this event, it has been found that the product can be retreated according to the process as set forth above to produce extremely pure free metal, that is, above 99.5 percent.

It will be evident to those skilled in the art that many modifications and variations of the basic process of this invention can be made. For example, the alkali metal used can be formed in situ from a mixture of alkali metal halide and alkaline earth halide by electrolysis in the molten state. The refractory metal oxide can then be added at or near the cathode of the cell and hydrogen gas passed through this mixture. Similarly, additional alkaline earth metal can be added over and above the amount of alkaline earth metal produced in the reaction. One efficient method of accomplishing this addition is to use the alkali metal-alkaline earth metal sludge formed in the electrolysis of the chlorides of these metals. Additionally, the mixture of the alkali metal hydride, alkaline earth metal hydride, and alkali metal halide and alkaline earth halide can be synthesized by merely mixing these compounds in the form of a finely divided state.

The process of this invention is adaptable to continuous operation. For example, an intimate mixture of sodium metal and calcium chloride can be fed to a reaction chamber, maintained at a temperature above about 750° C. under pressure above atmospheric and through which is passed hydrogen gas. This mixture is then transmitted to a second reaction stage wherein the temperature is raised to about 900° C. while still maintaining the flow of hydrogen, and titanium dioxide is continuously fed to this mixture. The reactor employed at this stage can be designed in order to achieve the particular residence time desired. The mixture is then heated or conveyed to a zone of higher temperature, as about 1200° C., wherein the pressure is reduced to remove the volatile constituents, and the reside is cooled and purified to result in the free metal. Other adaptations to continuous operation will be apparent.

The process of this invention provides an economical and efficient method for obtaining refractory metals in high yield and purity. These metals are becoming increasingly significant for their use in fabrication. Notably, titanium metal is highly desirable for this purpose inasmuch as it has the advantage of strength in addition to lower specific gravity.

Although the use of the reducing mixtures in the above discussions has been referred to with regard to refractory metal oxides, it is to be understood that these compositions can be employed to equal advantage for reducing refractory metal halides. For example, the mixture when reacted with a compound such as titanium tetrachloride will produce titanium metal. It can likewise be employed for reaction with other halides of titanium and halides of other metals including those which are non-refractory, as, for example, iron, copper, nickel, and the like. Still other uses for the mixtures of this invention will be evident to those skilled in the art.

I claim:

1. A process for the production of refractory metals from their oxides comprising heating to a temperature above about 800° C. an oxide of a refractory metal selected from the group consisting of zirconium, vanadium, chromium, hafnium, thorium, uranium, and titanium with a hydrided electrolytic sodium cell sludge originally containing at least 90% of a mixture of metallic calcium and metallic sodium, the calcium content of the sludge being at least 10%, the balance containing sodium and calcium chlorides, carrying out the heating in a hydrogen atmosphere for a time sufficient to reduce at least about 90% of the refractory oxide, displacing the atmosphere by an inert gas, dissociating refractory metal hydride formed during the reduction by heating the resulting mixture at a sufficiently high temperature, and then recovering the refractory metal from the product.

2. The process of claim 1 in which the refractory metal oxide is titanium dioxide and the inert atmosphere is anhydrous nitrogen-free argon.

3. The process of claim 1 in which an excess of the sludge is used in the reducing step and metallic sodium is distilled off and collected during the dissociation step.

References Cited in the file of this patent

UNITED STATES PATENTS

| | | |
|---|---|---|
| 1,602,542 | Marden | Oct. 12, 1926 |
| 1,704,257 | Marden et al. | Mar. 5, 1929 |
| 2,038,402 | Alexander | Apr. 21, 1936 |
| 2,043,363 | Alexander | June 9, 1936 |
| 2,243,059 | Bernstorff | May 20, 1941 |
| 2,427,338 | Alexander | Sept. 16, 1947 |
| 2,545,821 | Lindsley et al. | Mar. 20, 1951 |
| 2,584,411 | Alexander | Feb. 5, 1952 |

FOREIGN PATENTS

| | | |
|---|---|---|
| 542,410 | Great Britain | Jan. 8, 1942 |
| 698,753 | Great Britain | Oct. 21, 1953 |

OTHER REFERENCES

Chem. Abstracts, 1923, vol. 17, p. 3143.

Zeitschrift für anorganische und allgemeine Chemie, vol. 129, 1923, pp. 267–275.